United States Patent Office 3,038,902
Patented June 12, 1962

3,038,902
PIPERAZINE DERIVATIVE
Pliny O. Tawney, Passaic, N.J., assignor to United States Rubber Company, New York, N.Y., a corporation of New Jersey
No Drawing. Filed July 7, 1950, Ser. No. 172,620
3 Claims. (Cl. 260—268)

This invention relates to a new compound, N,N'-bis-(β,β,β-trinitroethyl)-1,4,-piperazinedicarboxamide and a method of making it from piperazine, potassium cyanate, formaldehyde and trinitromethane. The new material is useful as an explosive and propellant.

The new compound of my invention is N,N'-bis-(β,β,β-trinitroethyl)-1,4-piperazinedicarboxamide. It is made by reacting piperazine dihydrochloride with potassium cyanate to form piperazine-1,4-dicarboxamide, reacting this intermediate compound with formaldehyde in a slightly alkaline solution to form N,N'-dimethylol-piperazine-1,4-dicarboxamide, and finally reacting this second intermediate compound with trinitromethane.

The piperazine dihydrochloride and potassium cyanate are brought together, preferably in equivalent proportions and preferably in a suitable mutual solvent such as water. After being heated gently for some time, the solution is chilled, causing the piperazine-1,4-dicarboxamide to crystallize. The separated product is reacted with formaldehyde, preferably in equivalent proportions and conveniently in water in which a small amount of an alkaline catalyst has been dissolved. Such a catalyst is chosen from among the alkaline and alkaline earth hydroxides and carbonates which bring the pH of the solution above 7. The piperazine-1,4-dicarboxamide gradually dissolves as it reacts with the formaldehyde. When the reagent has completely dissolved, the catalyst is neutralized, preferably with a weak acid such as carbon dioxide. The N,N'-dimethylol-piperazine-1,4-dicarboxamide is separated, conveniently by adding a material, such as acetone, which causes precipitation of the product. The N,N'-dimethylol-piperazine-1,4-dicarboxamide and trinitromethane are brought together, preferably in equivalent proportions and preferably in a suitable mutual solvent such as water. The final product, N,N'-bis-(β,β,β-trinitroethyl)-1,4-piperazine-dicarboxamide, gradually crystallizes from the solution. After a suitable reaction time this new compound is isolated, conveniently by filtration.

The reactions are assumed to be as follows:

1.

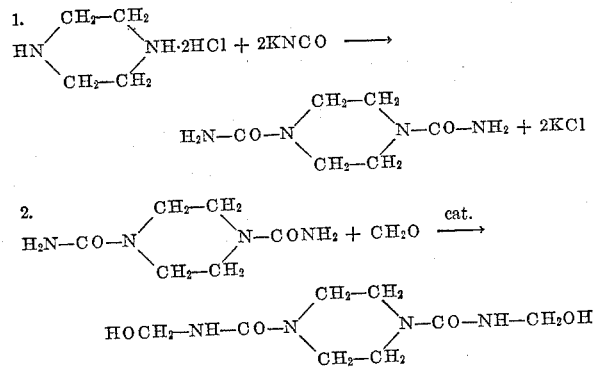

3.

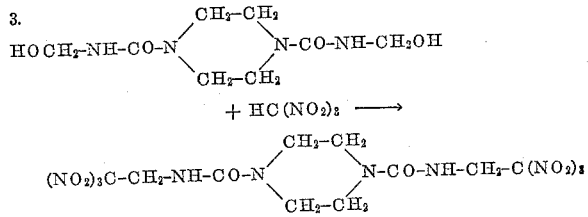

In the following example all parts are by weight.

*Example*

A solution of 38.8 parts (0.2 mol) piperazine hexahydrate in 50 parts water is neutralized with concd. hydrochloric acid, and then treated with a solution of 32.4 parts (0.4 mol) potassium cyanate in 80 parts water at 50° C. After about one hour, the solution is cooled in an ice bath, and the solid filtered. It is recrystallized from 200 parts water to yield 24.2 parts of piperazine-1,4-dicarboxamide, white needles, melting at 288–90° C. (decomp.). This compound has been made previously by other methods.

To a suspension of 6.8 parts (0.04 mol) piperazine-1,4-dicarboxamide in a saturated solution of barium hydroxide in 25 parts water are added 6.5 parts (0.08 mol) 37% formalin. After the solid has dissolved completely the solution is treated with carbon dioxide and the precipitated barium carbonate filtered. The filtrate is evaporated at room temperature in vacuo to a small volume. To the residue is added acetone, precipitating 3.5 parts N,N'-dimethylol-piperazine-1,4-dicarboxamide, which sinters to a brown mass at 190–210° C.

A solution of 2.3 parts (0.01 mol) N,N'-dimethylol-piperazine-1,4-dicarboxamide in 45 parts water at 45° C. is mixed with a solution of 3.0 parts (0.02 mol) trinitromethane in 10 parts water. After about one hour the white precipitate, 4.1 parts, is filtered. It is recrystallized from an acetone-water mixture to give 2.5 parts N,N'-bis-(β,β,β-trinitroethyl)-1,4-piperazine-dicarboxamide, white needles which explode at 186° without melting.

*Impact sensitivity.*—2.5 kg. hammer—60 cm.

*Analysis.*—Calcd. for $C_{10}H_{14}N_{10}O_{14}$: carbon, 24.1%; hydrogen, 2.8%; nitrogen 28.5%. Found: carbon 24.4%; hydrogen, 2.6%; nitrogen, 28.4%.

I claim:
1. As a new chemical compound, N,N'-bis-(β,β,β-trinitroethyl)-1,4-piperazine-dicarboxamide.
2. A method of making N,N'-bis-(β,β,β-trinitroethyl)-1,4-piperazine-dicarboxamide which comprises reacting piperazine-1,4-dicarboxamide with formaldehyde at a pH greater than 7 to form N,N'-dimethylol-piperazine-1,4-dicarboxamide, and reacting said N,N'-dimethylol-piperazine-1,4-dicarboxamide with trinitromethane to form N,N'-bis-(β,β,β-trinitroethyl)-1,4-piperazinedicarboxamide.
3. A method of making N,N'-bis-(β,β,β-trinitroethyl)-1,4-piperazinedicarboxamide which comprises reacting N,N'-dimethylol-piperazine-1,4-dicarboxamide with trinitromethane.

No references cited.